Oct. 15, 1957 — L. R. WOSIKA — 2,809,491
DIFFUSER TAILCONE
Filed Nov. 27, 1950 — 3 Sheets-Sheet 1
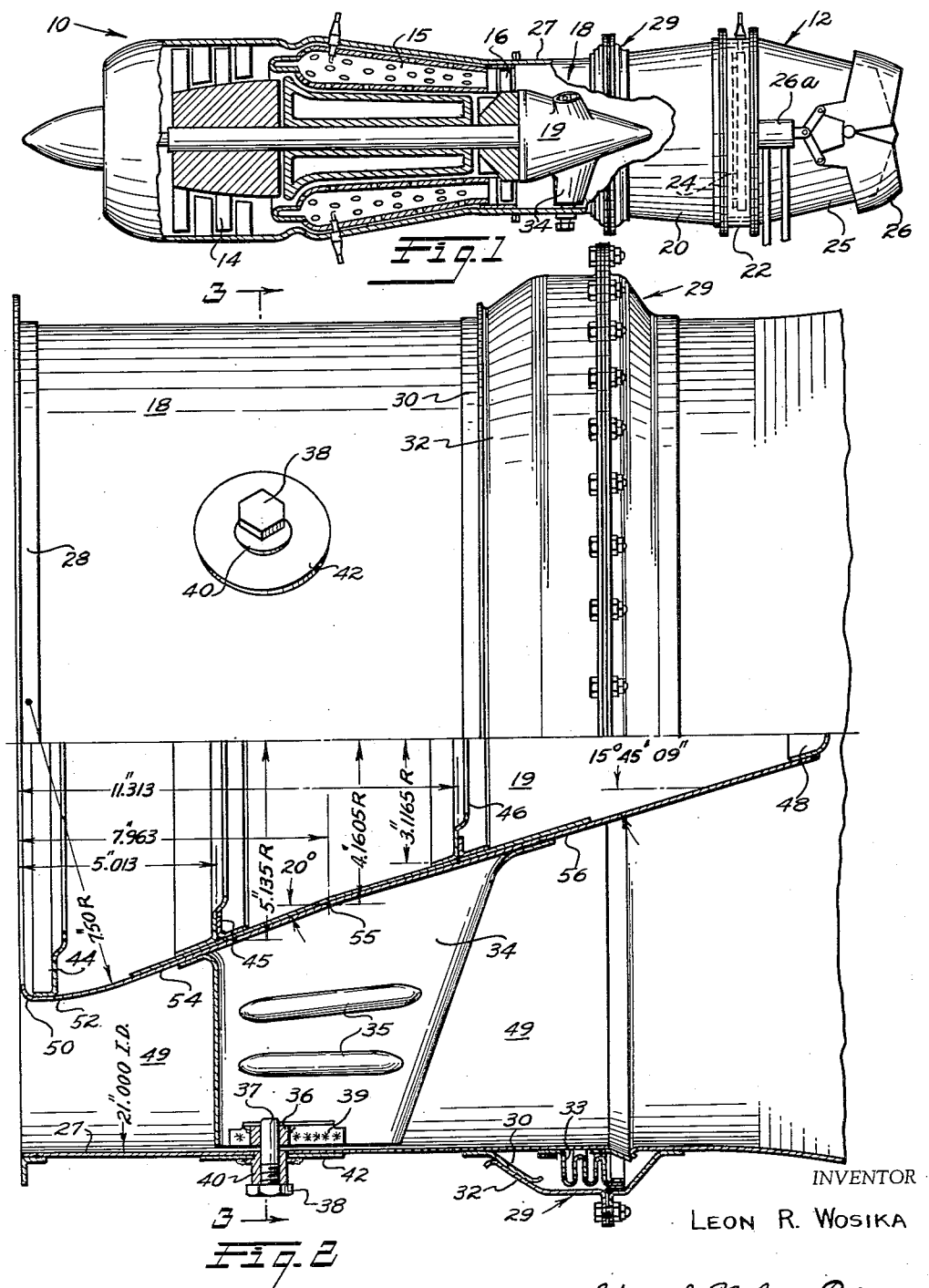
INVENTOR
LEON R. WOSIKA
BY Strauch, Nolan & Diggins
ATTORNEYS Oct. 15, 1957     L. R. WOSIKA     2,809,491
DIFFUSER TAILCONE Filed Nov. 27, 1950     3 Sheets-Sheet 2

INVENTOR
LEON R. WOSIKA
BY Strauch, Nolan & Diggins
ATTORNEYS

Oct. 15, 1957 — L. R. WOSIKA — 2,809,491
DIFFUSER TAILCONE
Filed Nov. 27, 1950 — 3 Sheets-Sheet 3
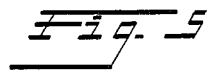
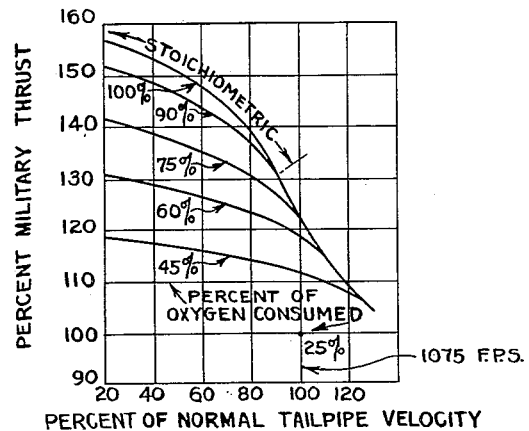
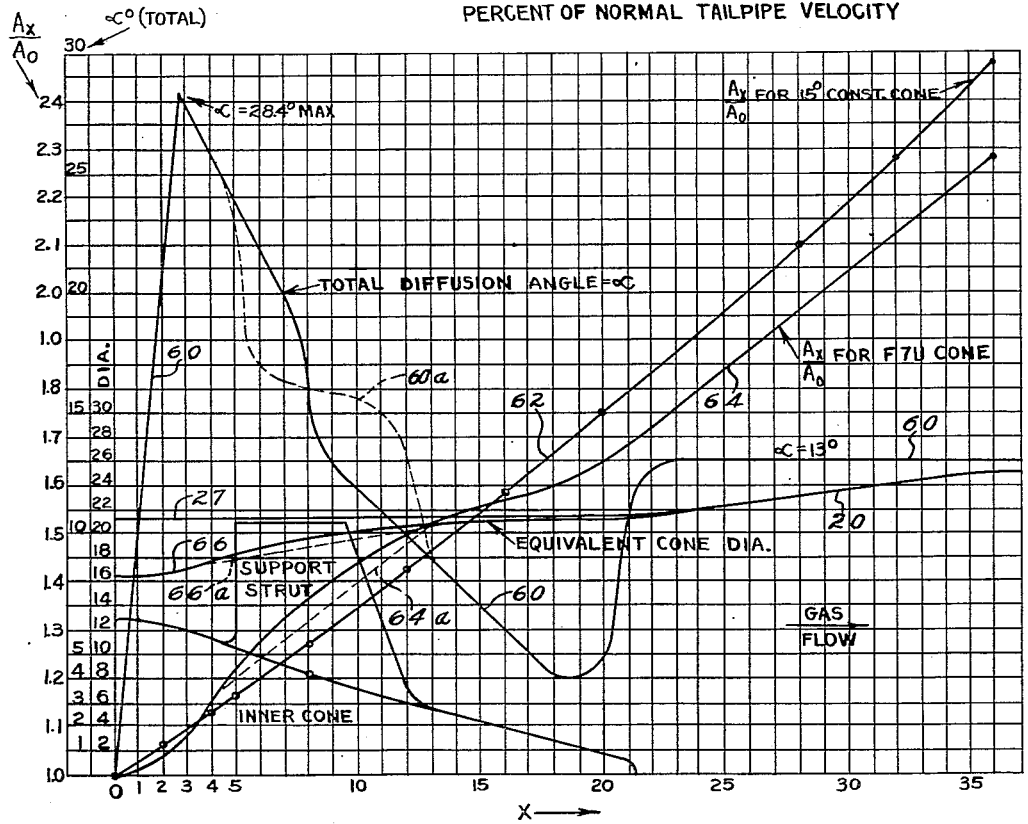
INVENTOR
LEON R. WOSIKA United States Patent Office 2,809,491
Patented Oct. 15, 1957

2,809,491

DIFFUSER TAILCONE

Leon R. Wosika, San Diego, Calif., assignor to Solar Aircraft Company, San Diego, Calif., a corporation of California Application November 27, 1950, Serial No. 197,738

3 Claims. (Cl. 60—35.6)

This invention relates to jet power plants, and has particular reference to jet power plants of the turbojet type in which a large portion of the energy developed is used for propulsion of a vehicle by jet or reactive forces.

In a conventional turbojet engine, air entering the intake is compressed by a rotary compressor, mixed with fuel and then burned in a combustion section. The hot gases drive a turbine which in turn drives the rotary compressor. The exhaust gases then pass through a tail cone section, which may be followed by a tailpipe, and issue therefrom in the form of a jet. The reaction of these gases exerts thrust which moves the vehicle, generally an airplane, forward. A characteristic of present turbojet engines is that a surplus of air is used over that required for combustion of the fuel, to keep the temperature of the hot gases down to a value that is not destructive of the mechanism.

Recently, successful methods and apparatus have been invented to utilize this surplus air by injecting additional combustible elements into the unburned exhaust gas components and burning the mixture. This "afterburning" is accomplished by means of an afterburner or tailburner and, because it greatly increases the velocity of the exhaust gases and thereby increases their jet or thrust action, it is becoming an increasingly important function of the jet power plant in both military and commercial aircraft.

Since the turbine inlet temperatures are limited, the typical turbojet engine consumes only about 25 percent of the available oxygen in the air flowing through it, leaving about 75 percent available for the afterburning process. However, the amount of thrust increase produced by the afterburner is not only a function of how much residual oxygen is consumed in the afterburner, but is also related to the static pressure ratio above ambient at which combustion takes place. The amount of residual oxygen consumed can be controlled by the quantity of fuel injected into the afterburner, while the pressure ratio at the burner can be fixed by the design degree of diffusing or slowing down of the high velocity exhaust gases leaving the turbine. In practice, the greater the percentage of oxygen consumed, the greater the thrust until the stoichiometric condition is reached where 100 percent oxygen is consumed. Also, when fuel is injected and burned in the afterburner, for a given percentage of oxygen consumed, greater thrust increases are obtained at the lower velocities of the gases during afterburning.

The manner of controlling the quantity of fuel injected into the afterburner is an afterburner controls problem and plays no part of this invention. For a detailed discussion of afterburner fuel controls reference may be had to Patents 2,737,016 and 2,737,775. The present invention is primarily concerned with an improved jet power plant including an afterburner and novel tail cone section providing improved and more rapid and efficient diffusion of the turbine exhaust gases to provide greater thrust with or without afterburning. Briefly, afterburning requires the diffusion of the gases leaving the turbine blades to a much lower velocity, and for the greatest benefit in thrust performance this diffusion process must be as efficient as possible.

The problem of diffusing exhaust gases in afterburner constructions arises because the normal velocity of the exhaust gases leaving the turbine wheel and entering the tail cone is in the range of 1075 F. P. S., whereas I have found that good afterburning in which additional fuel can be burned up to full stoichiometric condition is attainable practically with burning in normal approach velocities to the burner of up to around 400 to 430 F. P. S. Difficulty is however experienced at high altitudes in securing efficient burning at approach velocities of over 450 F. P. S. as is pointed out in Patent 2,726,511. Velocities of 400 to 430 F. P. S. though considerably higher than velocities previously considered practicable are a compromise predicated on the desire to keep the maximum diameter of the afterburner tailpipe no larger than the projected area of the turbojet or primary engine. The second design limitation in many aircraft, particularly those in which engine and afterburner are nacelle mounted, is that the afterburner be mounted at the shortest possible distance behind the turbine wheel. Thus, for optimum afterburning, as provided by my invention, there must be a considerable reduction in the velocity of the exhaust gases in the shortest possible distance between the turbine wheel and the afterburner.

Diffusion to around 400 F. P. S. approach velocity for afterburners of improved designs, such as those disclosed in Patents 2,688,843, 2,720,078, and 2,726,511, gives a 40% boost at sea level static where the normal velocity of the exhaust gases at the tailpipe nozzle is approximately 1750 F. P. S. without afterburning and increases to about 2450 F. P. S. with afterburning. Similarly, at an assumed aircraft velocity of 600 M. P. H. at sea level, the normal velocity of the exhaust gases at the nozzle is approximately 2070 F. P. S. without afterburning and approximately 2930 F. P. S. with afterburning which, in accordance with my invention, provides a resultant thrust increase of about 72%.

A serious drawback of the calculated values of thrust expected, given above, has been the losses occasioned in diffusing prime engine exhaust gases down to about 40% of the velocity at which they leave the turbine wheel. These losses, believed primarily attributable to diffuser design, have been in the order of approximately 6% in prior constructions. The fact that these losses take place during the entire time of jet operation has acted to largely offset the advantages of additional combat thrust to be gained during the comparatively short intervals of afterburning.

From the foregoing discussion it will be seen that the tail cone or diffuser section of a jet power plant plays an important part in the effectiveness of the afterburner assembly, and therefore in the amount of increased thrust obtained.

The tail cone sections of the prior art, whether or not followed by an afterburner, have followed very closely the constructon disclosed in U. S. Patents 2,516,819 and 2,508,420 to Whittle and Redding, respectively, and have been characterized by a very gradual increase in annular cross-sectional or duct area, this area being the cross-sectional area of the outer shell at any given point minus the cross-sectional area of the inner tail cone at the same point.

From a structural standpoint a short tail cone and rapid diffusion is advantageous, allowing the afterburner to be mounted closer to the primary engine, thereby making the whole assembly shorter and reducing the cost. However, from an aerodynamic standpoint, it has been generally accepted that diffusion could not take place in the tail cone section more rapidly than approximately 13° of equivalent cone angle. Equivalent cone may be defined as the surface of revolution whose cross-sectional area at any distance downstream from the turbine wheel is the same as the annular cross-section of the duct at the same point. Equivalent cone angle is twice the angle between a tangent at any point of the generating curve and the axis of the diffuser. These definitions will be further clarified later with reference to Figure 6. Equivalent cone angle may also be mathematically defined as follows:

$$\alpha = 2 \tan^{-1} \frac{A_2^{1/2} - A_1^{1/2}}{\frac{1}{2}\pi(X_2 - X_1)}$$

Where $A_1$ is the area of the duct at a distance $X_1$ from a reference point, and $A_2$ is the area at a distance of $X_2$ a differential distance downstream from the same reference point. Thus, in the prior art, tail cones for jet power plants have generally been cones of uniform and gradual slope to follow as closely as possible 13° of equivalent cone angle.

Contrary to the above established criteria for the design of tail cones and tail cone sections, I have discovered that in the area of high turbulence immediately following the turbine wheel, and before the gases therefrom have formed a low energy boundary layer area, a very rapid enlargement of duct cross-section through use of an increasing equivalent cone angle to gain considerably more rapid overall diffusion can be utilized in the area immediately downstream of the turbine wheel where the gases are extremely turbulent and no appreciable boundary layer of slower moving gases has been built up. Where previous opinion indicated that a diffusion angle approximately 13 degrees was about the maximum for efficient diffusion, the present much higher rate has actually reduced diffusion losses by more than 50%. It is believed that this rapid diffusion comes from the fact that the gases leaving the turbine wheel are in highly turbulent condition and that they are little impeded by boundary stalling as is to be expected of the rapid diffusion of less turbulent gases.

Slightly further downstream it is believed that the presence of the thickened boundary layer might cause separation if the high diffusion rate were continued. Therefore the diffusion rate has been dropped to more nearly the conventional 13 degrees.

In the immediate vicinity downstream of the supporting strut members the equivalent cone angle is still further reduced to minimize or neutralize any possible tendency of the gases to stall in the wake of these members.

Downstream thereof the cone angle is returned to a conventional value of 13 to 15 degrees as is common in prior art. A significant feature of my discovery is that in the diffusion of gases following an axial rotor, the existence of overall turbulence and the absence of boundary layer may be utilized to advantage in design by providing increased cone angle in this immediate vicinity where previously those skilled in the art avoided such wider angles as probably detrimental. Thus the advantages of the present invention are simultaneously structural, aerodynamic and economic.

With these and other considerations in view it is a prime object of my invention to provide a jet power plant including in combination a novel tail cone section which enables more rapid and yet efficient overall diffusion in the plant than has been heretofore possible.

Another important object of the invention is to provide a jet power plant having a tail-cone section which maintains a comparatively steady flow of gases to the afterburner thereby aiding in the stabilization of the flame pattern in the afterburner and increasing the afterburner efficiency.

A further object of the invention is to provide a tail cone section having less drag and impedance to flow than has been considered possible heretofore.

A more specific object of the invention is the reduction of drag and impedance of flow to less than that hitherto considered possible in tail cone diffuser installations, thus making possible the production of afterburners and afterburner equipped turbojet planes having non-afterburning characteristics comparable to those in planes having simple non-diffusing and non-afterburning tailpipes. This feature, it is believed, might prove to be a very major factor in the acceptance of afterburners as a safety feature for commercial aircraft in that diffusion losses no longer present a serious drawback during the customary non-afterburning operation.

A still further object of this invention resides in the achievement of rapid expansion of the desired diffusion in a far shorter space than has been possible in the prior art, thereby allowing the turbojets and turboramjets to be mounted in shorter nacelle structures.

Another object of this invention is to provide a tail pipe diffuser section having at its upstream end a zone of rapid diffusion of the exhaust gases followed by a zone of slower diffusion.

A further object is to provide in a tail pipe diffuser section with a forward portion thereof having an equivalent cone angle substantially greater than 13°; a center portion having an equivalent cone angle approximately equal to 13°; and a rearward portion having an equivalent cone angle substantially less than 13°, which then returns to approximately 13°, until the desired diffusion is accomplished.

Other objects and advantages will be apparent from the following disclosure in conjunction with the accompanying drawings and from the appended claims.

The accompanying drawings, in which like reference numerals are used to designate similar parts throughout, illustrate a preferred embodiment for the purpose of disclosing the invention. The drawings, however, are not to be taken in a limiting or restrictive sense since it will be apparent to those skilled in the art that various changes in the illustrated construction may be resorted to without in any way exceeding the scope of the invention.

In the drawings:

Figure 1 is a schematic diagram embodying the invention illustrating a jet power plant equipped with a tail cone section and afterburner assembly;

Figure 2 is an elevation, partly in section, of a preferred embodiment of the tail cone section;

Figure 5 is a graph illustrating the effect of oxygen consumed and exhaust gas velocity upon the thrust increase produced by the afterburner; and Figure 6 is a graph illustrating the rate of exhaust gas diffusion over the length of the tail cone section.

Figure 3:
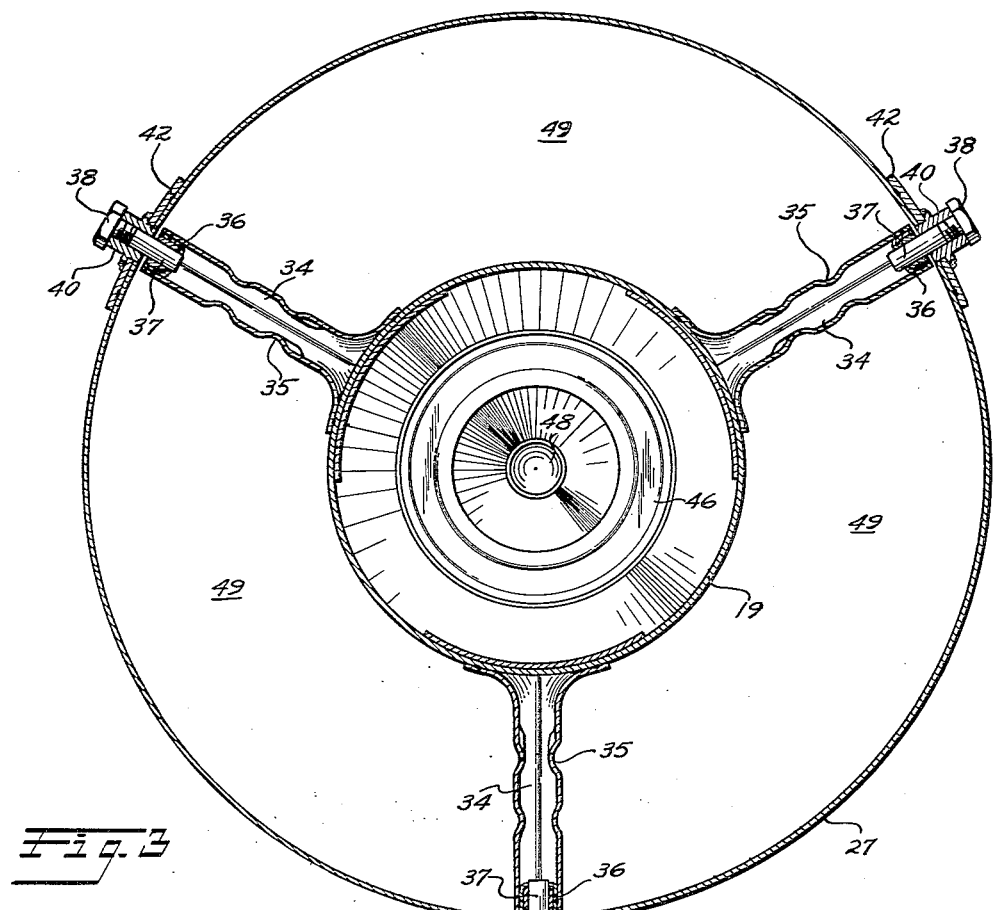
Figure 3 is a cross-section of the tail cone section taken along line 3—3 of Figure 2.

Referring now to the drawings, Figure 1 schematically illustrates a jet power plant which in this case is a turboramjet. The turbojet or primary engine is illustrated generally at 10, and the afterburner assembly is illustrated at 12. The primary engine 10 is comprised of a compressor 14, combustion chambers 15, a turbine 16, and a tail cone section 18 housing the inner tail cone 19. The afterburner assembly 12 comprises a diffuser section 20, an afterburner housing or shell 22 which houses the afterburner 24 and a nozzle section 25 upon which is mounted a suitable type of variable area nozzle 26 the opening of which is controlled through the control mechanism 26a in any suitable manner in accordance with afterburning and flight conditions.

The tail cone section 18, Figures 1 and 2, is comprised of an outer shell 27, and the inner tail cone 19. Outer shell 27 is surmounted at its forward or upstream end with a flange 28 which is secured to a matching flange of the primary engine 10 by suitable means such as bolts, so that the entire assembly may be readily disassembled. At its downstream end shell 27 may be secured to the diffuser section 20 of the afterburner assembly by means of an angular displacement ball joint, generally indicated at 29 in Figure 2. The joint 29, which allows for slight angular displacement between shell 27 and diffuser section 20 while at the same time maintaining a gas-tight seal, is provided with annular segments 30 and 32 secured as by welding to shell 27 and diffuser section 20, respectively. The segments 30 and 32 are maintained in close contact by compression of the bellows 33.

Figure 4:
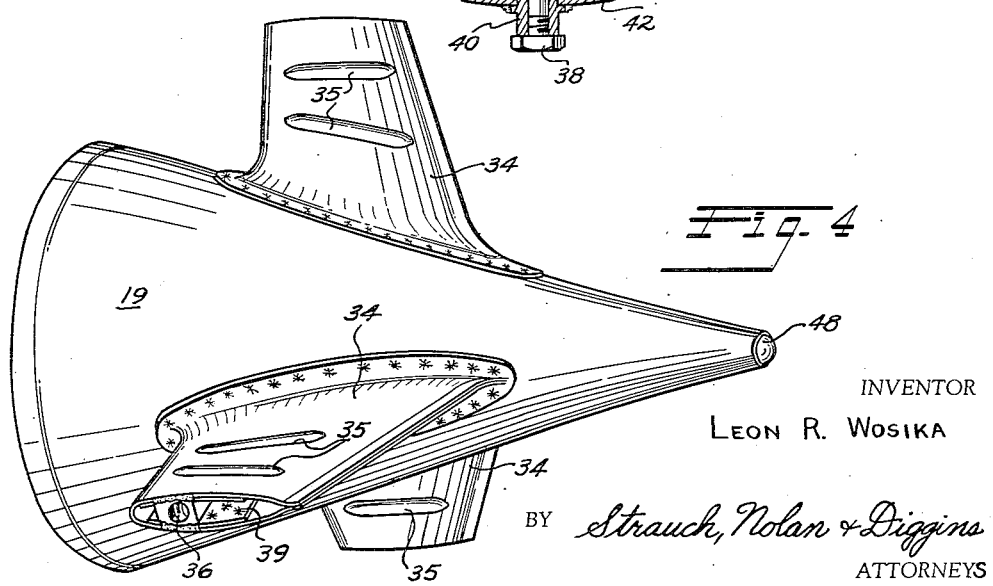
Figure 4 is an isometric view of a preferred embodiment of the inner tail cone.

The inner tail cone 19 is mounted in the outer shell 27, by means of three circumferentially spaced, radially extending supporting struts 34, Figures 3 and 4, which hold the cone in an axially aligned, spaced relationship with the shell. Struts 34 are made integral with the tail cone 19 by welding as shown, or may be formed integral with the cone in the manner disclosed in co-pending applicaton Serial No. 319,835, filed by Joseph R. Greene. While three struts are illustrated, it will be understood that two, four or more struts could be substituted for the arrangement shown. A three point suspension, however, is the preferred construction. As best illustrated in Figure 4, the struts 34 are streamlined in cross-section to offer as little resistance as possible to the flow of exhaust gases, and are provided with integral stiffening channels 35. Each strut is slidably supported by means of a collar 36 riding on the barrel shaped working surface 37 of a pin 38, Figures 2 and 3. This surface allows for slight angular distortion which may occur in the heating of the tail cone during operation. Collar 36 is secured to stiffeners 39 which are mounted in the end of the strut 34 as shown, by some suitable means as by welding. Pin bolt 38 is threaded into a boss 40 secured to outer shell 27 as by welding with suitable stiffeners 42. This method of mounting tail cone 19 gives the cone a three point suspension and, while firmly fixing the cone in proper spaced relation to shell 27, allows for radial expansion and for differential expansions of the various include elements without encountering the difficulties caused by differential expansions in the structures of the prior art. In other words, the inner cone when mounted as disclosed herein is free to grow and shrink radially and axially without the restraint of too great a number of rigidly held supports. Should there be any binding on the short pin bolts 38, this binding could result in a slight outward movement forcing the outer cone 27 slightly out of round to care for the expansion. This, however, could not seriously affect the after burning performance.

The inner tail cone 19 may be stiffened by inner annular flanges 44, 45, and 46 secured thereto by some means as by welding, and may also be provided with an end piece 48. A greater or less number of these flanges may be employed than the number shown, or the cone may follow the construction disclosed in the co-pending Greene application, cited hereinbefore, and eliminate the use of stiffeners altogether.

As will be seen from Figure 2, the outer diameter of tail cone 19 is substantially less than the inside diameter of shell 27, and since the elements are axially aligned this leaves an annular passage or duct 49 through which the exhaust gases leaving the turbine must flow. The surface of tail cone 19 differs from the usual conic or parabolic tail cone and gives to the surrounding annular duct 49 the improved exhaust gas diffusion characteristics of this invention. As has been pointed out hereinbefore, the amount of increased thrust produced by afterburning is not only a function of the percentage of residual oxygen consumed, but also of the degree of diffusing or slowing down of the high velocity exhaust gases leaving the turbine with resultant increase in pressure. This may be most clearly seen from the graph of Figure 5 which illustrates that the greatest thrust increase is obtained when 100 percent residual oxygen is consumed at the lowest percent of the normal velocity of the exhaust gases. Thus, the diffusion of the exhaust gases is of maximum importance in obtaining the greatest possible amount of increase thrust through the afterburning process. However, the subject invention is not only concerned with providing the structure necessary to insure diffusion for most effective afterburning, but is also vitally concerned with accomplishing this result in the shortest possible distance so that the overall length of the jet power plant may be reduced to a minimum.

It is also vitally interested in bringing the friction losses of the duct to an absolute minimum. In duct work, including ducted fans, a major source of loss has for a long time been attributable to diffuser losses and much work has been done over a period of many years to lessen these losses. This work has, in general, urged a very gradual increase in area as the solution to the problem. The use of rapid diffusion following rotors and blading represents an entirely new and highly successful solution to the problem.

Starting, therefore, with a cylindrical or substantially cylindrical outer shell 27 (Figure 2), the improved diffusion characteristics of this invention result from the shape of the novel inner tail cone 19. Tail cone 19, Figure 2, is so formed that the forward or upstream edge 50 thereof, directly after the turbine, is rounded; and directly back of edge 50 at 52 the cone surface is substantially parallel to the axis and the outer shell 27. This portion 52 of the tail cone is followed by a sharply sloping frusto-conical surface 54 which merges at 55 with a less sharply sloped conical surface 56. Certain dimensions and angles are noted on Figure 2 to illustrate, by way of example, the actual proportions of one practical application of this invention to a F7U fighter plane.

It will be noted that though the cone angle increases to well over 13 degrees that this is acomplished by an easy curve (7.50" radius) at 52. Even under highly turbulent conditions as are here present stalling is likely to occur downstream of any sharp change in section.

The curved portion 50 is likewise of importance for this assures that the edge will not stick out into the gas stream even if there are minor dislocations of the tail cone 19 due to acceleration forces, flight maneuvers, or differential temperature expansions.

The diffusion effect of a tail cone, formed as described above, upon the primary engine exhaust gases may best be described in connection with the graph illustrated in Figure 6. In this graph, the abscissas are in inches measured rearwardly from origin at the rear face of the turbine wheel along the axis of the tail cone 19 and afterburner diffuser section 20, and are denoted by "X." Three sets of ordinates are noted, the left set being the $A_x/A_0$ ratio, $A_0$ being the duct area at the origin, adjacent the rear face of turbine wheel, the middle set the equivalent cone angle and the right set the diameter in inches of the tail cone 19, outer shell 27 and afterburner diffuser section 20. In this connection it will be noted that while the major portion of the diffusion is accomplished by and in the tail cone section 18, the process is also continued to a lesser extent in the afterburner diffuser section 20. Outlined on the graph are the profiles of inner tail cone 19, outer shell 27 and diffuser section 20 in the same relative positions as are shown in Figures 1 and 2. This is to show how the novel shape of inner tail cone 19 controls the rate of diffusion and is illustrated by the curve 60. Curve 60 shows diffusion measured in terms of equivalent cone angle starting at 0 degree and thereafter mounts very rapidly to a maximum of approximately 28 degrees in only 3 inches. Thereafter, in the illustrated embodiment, the equivalent cone angle or diffusion angle is decreased becoming well under 13° in the area back of the supporting struts 34, and then is increased to approximately 13° downstream thereof after fairly uniform flow has been reestablished in the wake of the struts. Another means of visualizing the diffusion or expansion is by means of the area ratio $A_x/A_o$ where $A_x$ is the duct area at any point X and $A_o$ is the duct area at the turbine outlet, specifically at $X=0$. Curve 64 shows this ratio for the duct 27, 20 as modified by the existence of the inner cone. For comparison curve 62 shows the same ratio for a cone having a constant cone angle of 15 degrees. A fourth curve 66 indicates the diameter of a shell that has the same duct area as the annular passage or duct 49, i. e., the present cylindrical outer cone 27 less the present inner cone 19. This curve aids in visualizing the schedule of diffusion rate embodied in the invention by illustrating the change of area in terms of radius, or the physical aspects in a simple equivalent duct. This curve merges with outer shell 20 at approximately $X=21$ as the inner tailcone ceases at this point. For purposes of a better understanding of the meaning of "cone angle" it might be stated that the line 20 makes an angle of 6½ degrees with the horizontal equivalent cone angle 13 degrees at this portion of the line 60; thus the ordinate of the line 60 is indicative of the slope of the line 66 and 20, and vice versa. The partial curves 60a, 64a and 66a, shown in dash lines, are roughly indicative of average values of the basic lines 60, 64 and 66 when the effect of the struts on the flow area is taken into consideration. Thus, it will be seen that with the subject invention, notwithstanding the theories and practices of the prior art, diffusion can be accomplished in a tail cone at a high rate and in a relatively short amount of space.

The smoothing out or elimination of the upstream turbulences in the final portion of the diffuser at angles of less than 13 degrees permits a more uniform gas velocity to the afterburner and therefore more stable afterburning. The improved afterburning characteristics in turn result in an increase in sea level static boost from the previous 30% to the present 40%. Aerodynamically, the new and improved profile and consequent rapid rate of diffusion has caused a reduction in diffusion losses in the dry or no-burning condition due to drag from approximately 6% in the prior art to about 2%. Diffusion is a practical necessity in afterburning and the lessening of diffuser losses plays a very important part in the overall effectiveness of the turboramjet aircraft as it must be reckoned with during the entire flight of the ship and not only during afterburning. The minimizing of diffuser losses acomplished by this invention is also of advantage where fuselage mounting calls for a relatively long tail pipe with or without an afterburner. In such an assembly, the overall tailpipe losses are lessened by diffusing the gases, carrying them along the tailpipe at slower speeds and then accelerating them through the nozzle.

As mentioned hereinbefore in connection with the description of inner tail cone 19, its forward edge 50 is rounded (Figure 2), and the adjacent portion 52 thereof is substantially parallel to the outer shell 27. Both of these features are novel and of considerable importance in obtaining proper diffusion and in cutting down friction losses. In the prior art, as for instance in said Redding patent, the inner tail cone generally has a sharp leading edge and the portion of the cone following this edge is not parallel to the outer shell. I have found this sharp forward edge creates localized swirls and eddy currents which lower the overall efficiency of the tail cone section. Similarly, where the gases leaving the turbine are forced to change their direction of flow too rapidly, other turbulences and swirls are created in the already turbulent emerging gases which lower the overall efficiency and tend to increase friction losses. In this subject invention, however, the rounded leading edge and relatively straight flow passage adjacent the turbine outlet substantially eliminates these unwanted eddy currents and turbulences with a resultant greater efficiency. In addition, the illustrated construction overcomes to a large degree similar turbulences and localized swirls which might be set up due to misalignment of the elements due to local distortion and/or expansion of the inner tail cone.

From the foregoing description it will be apparent that the novel invention embodied herein overcomes to a large extent the draw-backs and difficulties of the prior art. With my invention diffusion of high velocity exhaust gases is possible at a higher rate of speed and in a shorter distance than has heretofore been thought possible, thus enabling the use of shorter tail cone sections and generally of less space between the primary engine turbine 16 and the afterburner 24. This allows the jet power plant to be mounted in shorter nacelle structures or to take less space in the aircraft fuselage, and also results in a saving in cost in the manufacture of the jet engine itself. Equally important, is the fact that with the more efficient diffusion provided by the invention increased afterburning efficiency is obtained. Thus, the exhaust gases are presented to the afterburner in a smooth and steady flow and at the optimum velocity for afterburning so that the percentage of thrust increase produced by the afterburner is higher than has been possible heretofore.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embaced therein.

What is claimed and desired to be secured by United States Letters Patent is:

1. In a jet power plant; an outer shell; an inner tail cone structure, said shell and said cone structure forming a duct for diffusing exhaust gases, said duct having a forward portion in which the equivalent cone angle increases to an angle substantially greater than 13° but less than the angle at which said gases stall, a center portion in which the equivalent cone angle decreases to an angle of less than 13° but more than zero degrees, and a rear portion in which the equivalent cone angle increases and becomes approximately 13° at the end of said rear portion; and means mounting said tail cone structure in axial alignment with said outer shell.

2. In a jet power plant having a turbine; a diffuser tail cone section for the exhaust gases from said turbine comprising an outer shell, and an inner tail cone structure having a plurality of supporting struts mounting said tail cone in axial alignment with said outer shell downstream of said turbine; said shell and said tail cone structure forming a duct for diffusing said exhaust gases, said duct having an equivalent cone angle which increases to an angle substantially greater than 13° but less than the angle at which said gases stall in the region intermediate said turbine and the leading edge of said struts, said equivalent cone angle decreasing smoothly from the leading edge of said struts to the trailing edge thereof and being less than 13° but more than zero degrees in the region intermediate the trailing edge of said struts and the trailing edge of said cone, said equivalent cone angle thereafter rising sharply in the region adjacent the trailing edge of said cone to an angle less than the maximum equivalent cone angle ahead of said struts.

3. In a jet power plant having a turbine; a diffuser tail cone section downstream of said turbine comprising a substantially cylindrical outer shell and an inner tail cone having a plurality of supporting struts mounting said inner tail cone in axial alignment with said outer shell; said tail cone having a rounded forward edge immediately downstream of said turbine followed successively in a downstream direction by a short substantially cylindrical portion, a sharply sloping frusto-conical section, the duct formed between said frusto-conical section and said shell having an equivalent cone angle which increases to an angle substantially greater than 13° but less than the angle at which said gases stall, said frusto-conical section being joined to said substantially cylindrical section upstream of said struts by a smoothly curving section to permit rapid diffusion of the exhaust gases without the stalling thereof, a less sharply sloping conical surface merging into said frusto-conical surface between the leading and trailing edges of said struts and extending downstream of said struts to permit diffusion of said exhaust gases at a decreased rate and to prevent the establishment of eddy currents in the wake of said struts, the radial spacing between said shell and said cone being increased adjacent the trailing edge of the cone downstream of said struts to permit diffusion of said exhaust gases at an increased rate downstream of said struts.

References Cited in the file of this patent

UNITED STATES PATENTS

| | | |
|---|---|---|
| 2,471,892 | Price | May 31, 1949 |
| 2,479,776 | Price | Aug. 23, 1949 |
| 2,508,420 | Redding | May 23, 1950 |
| 2,509,890 | Stalker | May 30, 1950 |
| 2,580,207 | Whittle | Dec. 25, 1951 |
| 2,639,579 | Willgoos | May 26, 1953 |

FOREIGN PATENTS

| | | |
|---|---|---|
| 807,926 | France | Oct. 26, 1936 |